March 30, 1926.

A. J. KEMPIEN ET AL

FOUL LINE INDICATOR

Filed Feb. 10, 1922      6 Sheets-Sheet 1

Inventors:
August J. Kempien & Thomas C. Forbes,
By: Fischer & Sygaard
their Attorneys.

March 30, 1926.  1,578,321
A. J. KEMPIEN ET AL
FOUL LINE INDICATOR
Filed Feb. 10, 1922  6 Sheets-Sheet 3

Inventors:
August J. Kempien &
Thomas C. Forbes.
By Fischer & Jagaard
their Attorneys.

March 30, 1926.

A. J. KEMPIEN ET AL

1,578,321

FOUL LINE INDICATOR

Filed Feb. 10, 1922    6 Sheets-Sheet 4

Inventors:
August J. Kempien & Thomas C. Forbes,
By: Fischer & Lagaard
their Attorneys.

Fig. 15

Patented Mar. 30, 1926.

1,578,321

UNITED STATES PATENT OFFICE.

AUGUST J. KEMPIEN, OF ST. PAUL, AND THOMAS C. FORBES, OF MINNEAPOLIS, MINNESOTA; SAID FORBES ASSIGNOR TO SAID KEMPIEN.

FOUL-LINE INDICATOR.

Application filed February 10, 1922. Serial No. 535,548.

*To all whom it may concern:*

Be it known that we, AUGUST J. KEMPIEN, of St. Paul, Ramsey County, Minnesota, and THOMAS C. FORBES, of Minneapolis, Hennepin County, Minnesota, both citizens of the United States, have invented a new and useful Improvement in Foul-Line Indicators, of which the following is a specification.

Our invention relates to foul line indicators and has for its object to provide a device adapted to become operable to indicate when the foot of a bowler passes the foul line, which device remains inoperative upon the passage of a bowling ball thereover.

Another object of the invention is to provide an electrically operated signalling device with a switch positioned in the floor of the bowling alley at the foul line thereof including means for causing said signal to remain operative for a period of time after the actuation thereof.

Another object is to provide a time controlled mechanism for holding said signalling device in operative position for an extended period of time after the action thereof.

Another object is to provide an actuating mechanism for said signal which mechanism becomes operable upon the passage of the foot over said foul line switch, which remains inoperable upon the passage of a bowling ball over the same.

A still further object is to form said actuating mechanism with an electro-magnet including an armature having a time controlled device applied thereto.

A still further object is to provide a device for varying the current applied to said electro-magnet so as to jointly aid in regulating the time of movement of said armature.

Another object of the invention is to provide a bell and a light signal and to provide means for prolonging the operation of the light signal over the operation of the bell signal.

Another object is to provide means for adjusting the magnet of the actuating mechanism relative to the armature thereof.

Another object of the invention resides in providing a switch element positioned at the foul line in a single unit which may be readily removed from the floor and replaced by a small unit.

Another object resides in forming the said switch element with a plurality of sections and a plurality of independent switches adapted to be operated thereby.

A still further object is to provide actuating members adapted to be engaged by the foot for operating said switches, said members traveling in parallel relation so that the displacement of the same at any portion thereof causes the switch elements to move the same amount.

Another object is to provide latching means for said foul line switch whereby the device as a unit may be securely held in place or may be readily detached as required.

A still further object of the invention is to provide a dummy which may be used in to place of the switch whenever it is desired to completely remove the switch from the floor.

A still further object is to provide a guard which may be placed over the switch in the floor when it is desired to clean or varnish the bowling alley to protect the switch mechanism thereon.

Another object of the invention resides in providing a signal device having an actuating mechanism therefor with two controlling members positioned in the floor of the alley the first of which always tends to operate said signal, the second of which is spaced from said first controlling member and is adapted to counter-act the effect of said first controlling member to render the signal inoperative when successively operated.

The full objects and advantages of our invention will appear in connection with the detailed description thereof and are particularly pointed out in the claims.

In the drawings, illustrating the application of our invention in one form:—

Figure 1:
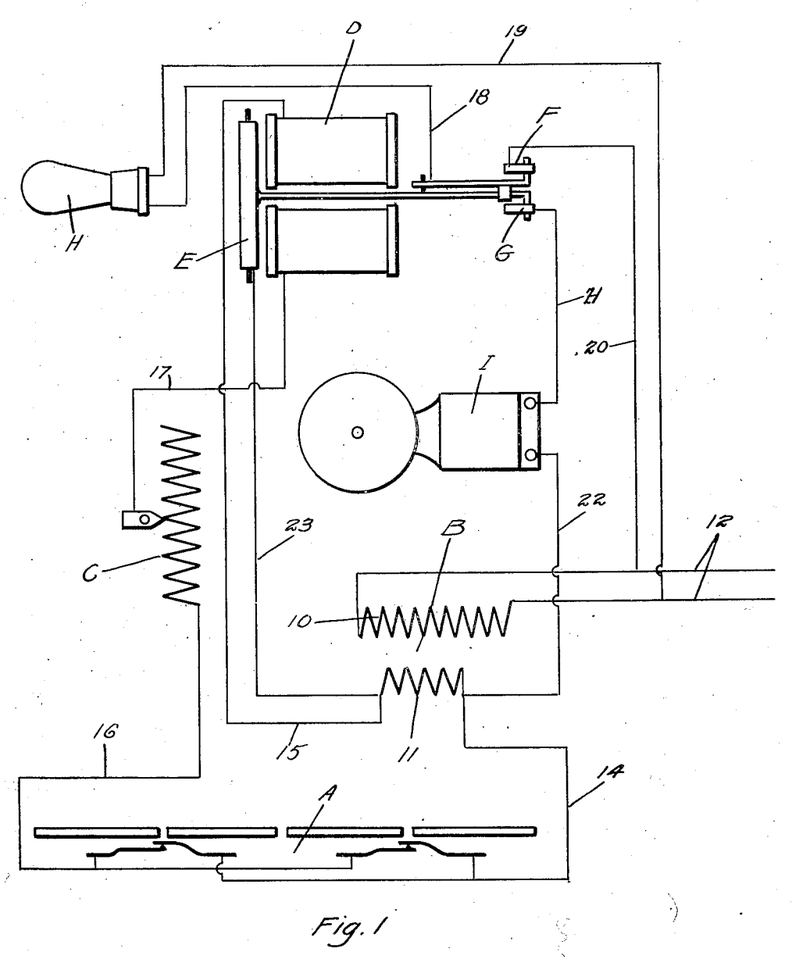
Fig. 1 is a diagrammatical view showing the circuits and general arrangement of the various portions of our invention.

Our invention diagrammatically indicated in its entirety in Figure 1 is operated by a transformer B having a primary coil 10 connected to any suitable source of electrical current such as a 110 volt circuit, by means of leads 12 and a secondary coil 11 for the reduction of the voltage of circuit 12 which supplies the current for the operation of the device. A switch member indicated in its entirety at A is positioned in the floor of the bowling alley at the foul line thereof, which switch member is connected in series with the secondary or low voltage side 11 of the transformer B, a variable resistance unit C and an electro-magnet D by means of a number of leads 14, 15, 16, and 17. Magnet D is provided with armature E adapted to be actuated thereby which armature operates two switch elements F and G. Armature E is further provided with an adjustable device for regulating its period of oscillation, which will later be described in detail. By varying the period of oscillation of the armature E and by properly adjusting the amount of current passing through the magnet D by means of a resistance C the said armature E can be made to become responsive when the current is passed through magnet D for a certain length of time and then remain inoperative when the closure of the circuit by means of switch A occurs for a shorter length of time.

Armature E, as before stated, is adapted to close two switch members F and G when the said armature is actuated by means of the magnet D. The switch element F is connected in series with an electric light H by means of leads 18, 19, and 20, the leads 19 and 20 being directly connected to the circuit 12 of the source of electrical supply. When switch member F is closed by means of armature E lamp H which may be of standard construction is caused to be illuminated.

The switch element G is connected in series with the secondary coil 11 of transformer B and with an electrical bell I of ordinary construction by means of leads 21, 22, and 23. When switch G is closed by means of armature E the bell I is caused to ring. The operation of the device in general can easily be comprehended. Upon the passage of the foot over the foul line, switch A is caused to be closed for a certain length of time. The resistance C and the device which regulates the period of oscillation of magnet E are so adjusted that the movement of the foot over the switch will give sufficient time for the armature to be attracted by magnet D and for the switches F and G to be closed. Immediately upon withdrawal of the foot from switch A the circuit is again opened and armature E allowed to return to normal position. The actuation of armature E, however, closes switches F and G which immediately actuates the bell I and the lamp H. However, to cause both the said bell I and lamp H to remain operative for a long enough period of time to be observed by the bowler I have provided a time controlling mechanism whereby said signals remain in operation for a period of time, the description of which device will follow.

Figure 2:
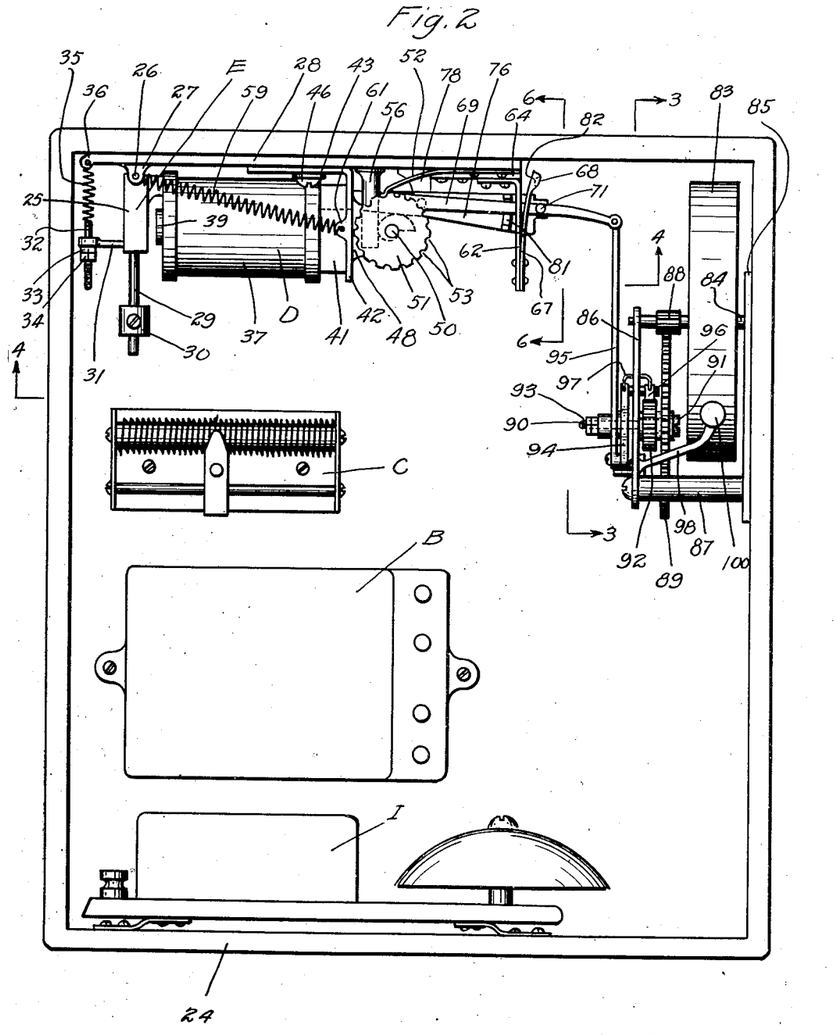
Fig. 2 is a front view of the casing containing the actuating mechanism of the invention.

The principal portion of the signalling mechanism is shown in Figure 2 of our invention and is contained within a casing 24 which may be of wood or any other suitable material. Within this casing are attached thereto in any desirable location the bell I, transformer B, resistance C, electro-magnet D, armature E, the switches F and G, and the time controlling mechanism associated with the same. The transformer B, bell I, lamp H, and resistance C are all of standard construction and need no further description.

The armature E is formed in the shape of a plate 25 which is pivoted at its end by means of pins 26 to lugs 27 issuing outwardly from a base 28 secured to the upper wall of casing 24. This armature hangs in a vertical position and has a depending arm 29 on which is adjustably mounted a counterweight 30. A bracket 31 projecting outwardly from said arm on the left hand side has adjustably positioned in the same a sliding rod 32 which is held in place by two nuts 33 and 34 and which has attached to it tension coil spring 35 secured at its other end to a lug 36 attached to base 28. By means of said spring 35 armature E is normally held in the position shown in Figure 2.

Magnet D for operating the armature E consists of two coils 37 and 38 which are wound upon cores 39 and 40 secured together by means of a yoke 41. The yoke 41 has a plate 42 which terminates in an angular base portion 43 positioned in back of the coils 37 and 38. Base 43 is provided with two longitudinal slots 44 and 45. Two screws 46 pass through slots 44 and 45 and are screwed into base 28. These slots serve to hold the base 43 and the magnet D mounted thereon in slidable position upon said base 28 relative to the armature E. By means of this mounting magnet D may be adjusted relative to armature E so that the cores 39 and 40 may be positioned at any suitable distance from the said armature E whereby the attractive effect of magnet D upon the armature E may be varied as required.

For regulating the magnet D relative to armature E we provide the following device. Upon the plate 42 are provided two bearings 48 and 49 in which is journalled a shaft 50. Shaft 50 is provided at its outer end with a thumb wheel 51 which is rigidly secured thereto. A spring 52 is secured to base 28 and is adapted to engage serrations 53 formed in the periphery of said wheel for holding the said wheel in any of its adjusted positions. Upon the shaft 50 is mounted two spiral cam members 54 and 55 best shown in dotted lines in Figure 2 and full lines in Figure 4. These cams are adapted to engage two posts 56 and 57 which are rigidly secured to the base 28 and extend outwardly in front of the said cams. A pair of coil springs 59 and 60 attached to lugs 27 on base 28 and similar lugs 61 formed on plate 42 serve to force the entire electro-magnet D with the mounting thereon towards the armature E, the movement of the said electro-magnet being halted by the engagement of the cams 54 and 55 with the posts 56 and 57. It can readily be comprehended that by adjusting the wheel 51 the movement of the cores 39 and 40 relative to the armature E can be varied at will to give the desired attractive effect of the magnet upon the armature.

The switch G comprises a bracket 62 which is rigidly secured to an insulating block 64 by means of screws 65 which block is attached to base 28 by means of screws 66. Upon the extreme end of bracket 62 is rigidly attached a spring member 67 which issues upwardly towards the base 28 gradually receding from the said bracket 62. At the extreme end of spring 67 the same is formed with a contact 68 which forms a portion of the switch element G. A long slender arm 69 is rigidly attached to the plate-like portion 25 of armature E and extends along the base 28 between the two coils 37 and 38 of magnet D and through an opening 70 formed in the core 41 and plate 42. This opening permits of oscillatory movement of the arm 69 about the pins 26 as armature E is attracted by the magnet D. Near the outer end of arm 69 the same is provided with a pin 71 which serves as a contact member engaging the contact 68 on spring 67. When armature E is attracted by the magnet D the same together with the arm 69 takes the position indicated in Figure 5 in which position pin 71 is in contact with the contact member 68 at which position switch G is closed. The leads 21 and 23 connected to the switch G may be connected to the screws 65 and the base 28 respectively or in any other manner desired.

Figures 4, 5:
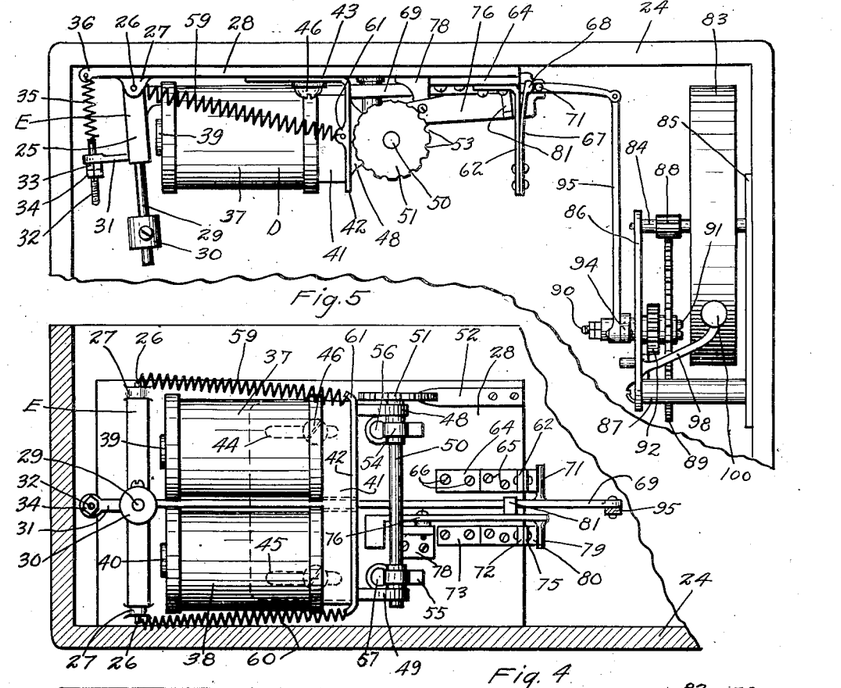
Fig. 4 is a fragmentary sectional view taken on line 4—4 of Figure 2.
Fig. 5 is a view similar to Figure 2 of a portion of the mechanism shown therein with certain of the parts indicated in altered positions.

Switch F which is best shown in Figure 4 is substantially identical with switch G and consists of a bracket 72 mounted on an insulating block 73 and formed with a spring 75, having a contact 80 at the end thereof, all identical with the bracket 62, block 64, and spring 67 and contact 68, of switch G. A pivoted arm 76 pivoted at 77 to an upright 78 mounted on base 28 carries on its extreme end a pin 79 corresponding to pin 71 which is adapted to engage the contact member 80 formed on the end of spring 75 and to close the said switch F when said arm 76 is raised in its uppermost position. For operating the arm 76 we provide a forked insulating member 81 which is rigidly secured to said arm and which embraces a portion of the arm 69 attached to armature E. After arm 69 is raised upwardly said arm engages the upper portion of member 81 and carries with it the arm 76 until pin 79 comes in contact with the contact 80. This contact is identical with contact 68 excepting that the same is formed with a slight indentation or notch shown in dotted lines at 82 in Figure 2. This indentation serves to hold the arm 76 and pin 79 engaging contact 80 in place until said arm 76 is forced downwardly. Upon movement of arm 69 downwardly the same engages the lowermost arm of the member 81 thereby withdrawing pin 79 from engagement with contact 80. In this manner the circuit switch F is operated.

The timing device for holding switches F and G closed for an extended period of time consists principally of a fly wheel 83 which is mounted on a shaft 84 journalled in a base 85 secured to casing 24 and in a support 86 attached to the base 85 by means of an upright 87. Shaft 84 has mounted on the same a pinion 88 which meshes with a gear 89 rotatably mounted on a trunnion 90 rigidly secured to the support 86. The trunnion 90 is formed with a head 91 which holds the gear 89 in place thereon, the said trunnion being screwed into the support 86 after gear 89 is placed thereon. Rigidly attached to gear 89 is a ratchet wheel 92 which travels together with the same. As can clearly be seen in Figure 2 the extreme end of shaft 90 extends beyond the support 86 on the other side thereof as indicated at 93. Upon the protruding end 93 is mounted a swinging arm 94 which has pivoted to it at one end a link 95 which in turn is pivoted at its other end to the extreme end of the arm 69. In the other end of arm 94 is pivotally attached a pawl 96 which engages the ratchet wheel 92 and serves to operate the same. The exact shape of the arm 94 and the manner of attaching the pawl 96 thereto can best be shown in Figure 3. This pawl is normally held in engagement with ratchet wheel 92 by means of a wire spring 97 of ordinary construction. The operation of this device is evident. As the arm 69 and link 95 attached thereto are simultaneously drawn upwardly by the attraction of magnet D upon the armature E arm 94 is rotated about the shaft end 93 permitting the pawl 96 to ratchet upon the ratchet wheel 92. When arm 69 reaches its uppermost position spring 35 tends to draw armature E backwards and to force arm 69 and the link 95 downwardly. This motion is transmitted through pawl 96 to the ratchet wheel 92 and the gear 89 which drives the pinion 88 and the fly wheel 83. Due to the momentum of the fly wheel 83 the power imparted to it being relatively small, the said fly wheel regulates speed at which the arm 69 descends thereby causing the same to slowly return to normal position.

In operation the attraction of armature E by magnet D as before stated simultaneously closes both switches G and F, at the same time shifting the pawl 96 relative to ratchet wheel 92. Upon the reopening of the switch member A spring 35 becomes effective to return arm 69 as before specified and fly wheel 83 regulates the speed of movement thereof. As soon as switches G and F are closed the electric light H and bell I are immediately set into action. The bell I being connected in circuit with switch G the same is first cut off as soon as pin 71 leaves the contact member 68. The light H, however, continues to burn after the bell has stopped until the arm 68 strikes the lowermost arm of the member 81 at which time arm 68 forces pin 79 away from engagement with the contact member 80 thereby breaking off the light circuit. In this manner a device is secured in which the bell operates for a short time whereas the light continues to burn a considerable time after the foul has been committed. The utility of this is evident in that the player when first committing the foul hears the bell for a short time and then glances around to see the foul indicating light burning. To eliminate continual ringing of the bell the operation of the same is terminated before the light goes out since the signal can be heard without the player turning around as becomes necessary in the case of the light.

Figures 3, 6:
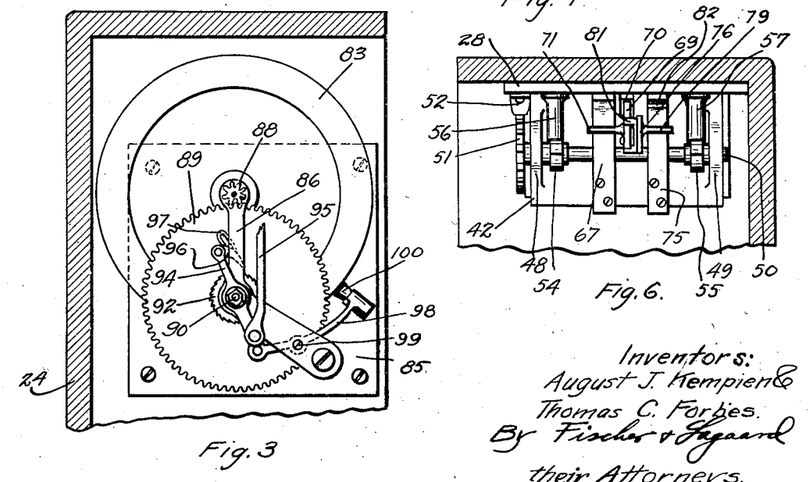
Fig. 3 is a fragmentary sectional view taken on line 3—3 of Figure 2.
Fig. 6 is a fragmentary sectional detail view taken on line 6—6 of Figure 2.

For stopping the rotation of the fly wheel 83 when link 95 and arm 94 reach their lowermost position as shown in Figure 2 we provide a brake best shown in Figures 3 and 2. This brake comprises an arm 98 pivoted to the support 86 at 99. One end of arm 98 is adapted to be engaged by the lowermost portion of the link 95 as the same descends. The other end of arm 98 extends inwardly in front of the face of fly wheel 83 and has attached to it a brake shoe 100 which is adapted to engage the periphery of said fly wheel when the link 95 has reached its lowermost position thereby engaging said fly wheel and terminating the movement thereof. In this manner the movement of fly wheel is stopped so as to render the device immediately reset and again operable upon the commission of another foul by the next player within a very short time after the commission of the first foul.

The switch A which is positioned in the floor of the bowling alley at the foul line thereof consists of a unitary structure adapted to be detachably positioned within a narrow slot cut into the floor of the bowling alley across the same indicated at 139. This switch is mounted upon an angular body member 105 which has a base 106 and an upstanding flange 107. The switch mechanism consists of two independent switches J and K, each of which consists of a pair of flat spring members 108 and 109 extending longitudinally of the device and over-lapping each other as clearly shown in Figure 7. The springs 108 are directly secured to the base 106 of angle 105 making an electrical contact therewith while springs 109 are also secured to said base but are insulated therefrom by means of insulating blocks 110. Both of these springs are formed with contact points 111 so that when the uppermost spring 109 is placed downwardly the said points come in contact and the circuit passing through these springs is completed. For adjusting the relative position of spring 108 to spring 109 we provide arms 112, which are pivoted to the flange 107 of angle 105, and 113. The forward end of arm 112 is formed with a lug 114 adapted to engage the upper portion of spring 108 so as to regulate the position of said spring when the said arm is oscillated. At the other end of arm 112 the same is formed with an arcuate slot 115 through which a screw 116 passes, which screw may be used for clamping said arm in place after springs 108 have been properly set.

Figure 10:
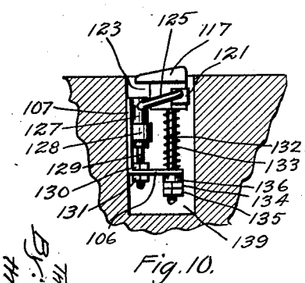
Fig. 10 is an end view of the device shown in Figure 9 with the latching mechanism thereof removed.
Figure 11:
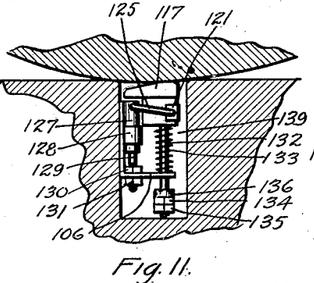
Fig. 11 is a view similar to Figure 10 with the parts corresponding in relation to one another as indicated in Figure 9.

For closing switches J and K we provide four operating members 117, 118, 119, and 120, which as shown in Fig. 10, normally project a small amount above the level of the floor and are adapted to be depressed by the bowling ball or player's foot as the same comes in contact therewith as clearly shown in Figure 11. These members are mounted for movement upon the angle 105 as follows: Operating members 117—120 are preferably formed of some insulating material such as bakelite and have integrally cast at the ends thereof metal inserts 121 and 122. These members are further formed with a rabbeted recess 123 extending along the entire length thereof. A wire member 124 is positioned in the recess 123 and extending throughout the length of each of the members 117, 118, 119, and 120 and has its ends bent about the ends of said members as indicated at 125 in Figure 10 with the extreme ends 126 thereof longitudinally journalled in the inserts 121 and 122 as clearly shown in Figure 8. Along the longitudinal portion of wire members 124 the same are journalled adjacent the portions 125 in a pair of vertically positioned uprights 127 which are attached to the body member 105 as follows: At the point of attachment of said uprights 127 to body member 105 the metal of the flange 107 is sheared from the major portion of the said body portion and pressed outwardly therefrom as indicated at 128 forming openings between said displaced portion 128 and flange 107 of angle 105. Uprights 127 are adapted to snugly pass through these openings and to be held in place adjacent the flange 107 by means of the portions 128 thereof. Uprights 127 are further formed with a reduced threaded portion 129, which extends through the base 106 of angle 105 as clearly shown in Figure 10. By means of two nuts 130 and 131 the exact position of the said uprights 127 may be adjusted and varied as required. By this means it can readily be comprehended that each of the operating members 117—120 is mounted for vertical oscillation about the longitudinal axes relative to the body member 105. For guiding said members 117—120 in their oscillation relative to the device we provide for each of these members a threaded stem 132 which is secured to each of said members and which passes through the lower flange 106 of angle 105 and is slidably mounted therein. Positioned between members 117—120 and the base 106 on each of the stems 132 is a compression coil spring 133 best shown in Figures 8 and 10 which serves to hold the said operating members in their uppermost position. This position may be regulated by means of a nut 134 and a lock nut 135 screwed upon the extreme threaded end of said stem 132. A resilient bumper 136 positioned between nut 134 and the lowermost portion of base 106 serves to remove the jar from the mechanism when the said operating members are released and also tends to make the operation of the device noiseless. With this construction it can readily be comprehended that the before mentioned operating members may travel in a substantially vertical and parallel direction as the ball or player's foot passes over the bowling alley floor at the foul line thereof. For operating switches J and K members 117 and 120 are formed at their inner ends and members 118 and 119 at their outer ends with downwardly projecting engaging lugs 137 and 138 which are adapted to engage upon the upper surfaces of the springs 109 so that the depression of any of the said operating members will cause one of the switches J or K to be closed. The exact position of the parts when operating member 117 has been depressed is clearly shown in Figures 9 and 11.

In installing switch member A into the floor of the bowling alley a rectangular slot 139 is cut across the floor of the alley which is the same size and depth throughout its length. Within the said slot is screwed two wood screws 140 and 141 upon which the body 106 of angle 105 is adapted to rest when the switch is placed within the said slots 139. These screws may be adjusted so that the operating members 117—120 project just exactly the right amount above the floor when in normal position. For holding the device fast in place within the slot 139 we provide a pair of hooks 142 and 143 which are pivoted to the flange 107 of angle 105 and which project through the base 106 thereof and are secured to engage the head of screw 140. These hooks are forced towards one another to grasp the head of said screws by means of two coil springs 144 and 145 which are mounted on a spindle 146 and are seated between the outer surfaces of said hooks 142 and 143 and two nuts 147 and 148 screwed upon the ends of said spindle 146. With this construction it can readily be seen that the device is firmly held in place by means of hooks 142 and 143 which slip over the head of screw 140 as the device is pressed downwardly into the slot 139.

Figure 7:
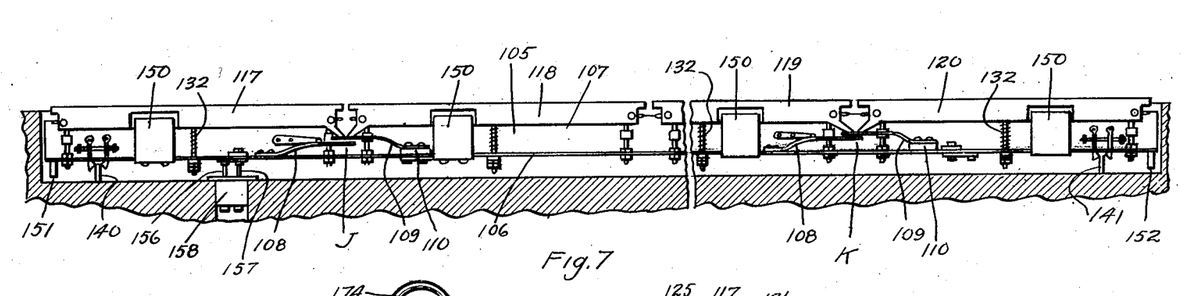
Fig. 7 is a sectional view taken through the foul line of the alley showing the switch mechanism located therein.
Figure 12:
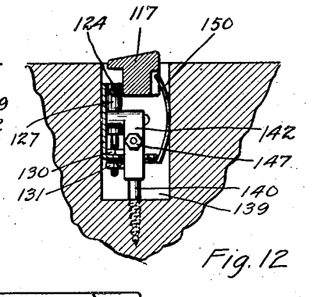
Fig. 12 is a sectional view taken on line 12—12 of Figure 8.

For preventing side movement of the entire structure when in the slot 139 we provide a number of relatively flat spring members 150 which as clearly shown in Figures 7 and 12 are secured to the underside of the base 106 of angle 105 and which are adapted to engage the side wall of slot 139 as shown in Figure 12 to force the flange 107 of said angle against the other wall of said slot thereby firmly holding the device in place. In removing the entire spring structure from slot 139 we provide a wire hook which is not shown in the drawings but which may be inserted beneath either of the operating members 117 and 120 and by means of which the entire structure may be raised at one end. Due to the hook members 142 and 143 engaging the inclined under-surface of the head of screw 140 the same is readily released therefrom as the structure pulls upwardly. In this manner the said hooks engaging the screw nearest the end where the hook is applied is readily disengaged. In order to disengage the hook members 142 and 143 from the other screw we provide two depending lugs 151 and 152 at the extreme end of the device which as the structure is raised engage the bottom of slot 139 and serve as a fulcrum whereby the adjacent attaching device may be disengaged as the switch unit is lifted from the slot. It can readily be comprehended that the entire switch mechanism may be bodily removed from the slot and could be rapidly replaced as required.

Figure 8:
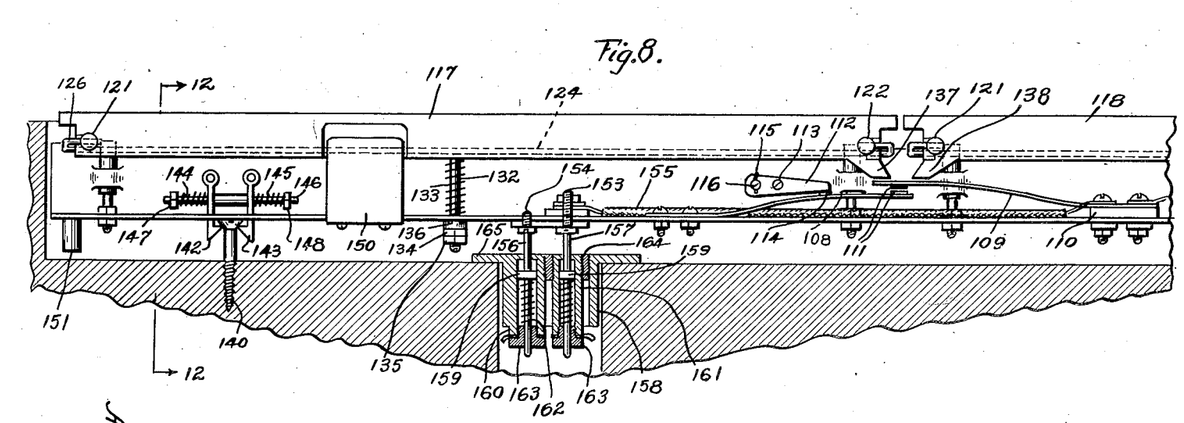
Fig. 8 is an enlarged detail view of a portion of one end of the device shown in Figure 7.
Figure 9:
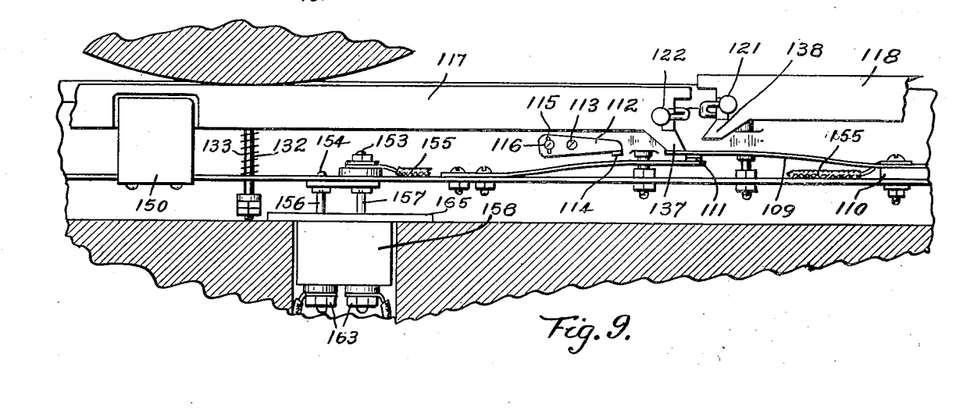
Fig. 9 is a view similar to Figure 8 with the parts in altered positions.

The manner of connecting switches J and K with the other parts of the invention can be best be comprehended from Figure 8. A screw 153 is secured to the base 106 and insulated therefrom. A similar screw 154 is also secured to said base making an electrical connection therewith. Both of these screws have their heads extending below the lowermost portion of said base. Screw 153 is connected by means of a conductor 155 which passes along the corner of angle 105 and is connected to each of the spring members 109. A pair of spring held contact members 156 and 157 such as are in common use in electrical circuits are adapted to engage the heads of screws 153 and 154 to make contact therewith. These contact members are mounted within a housing 158 and are shown in detail in Figure 8. Each of said members 155 and 156 are provided with a shoulder 159 and are slidably mounted within sleeves 160 and 161. A coil spring 162 positioned on the said members 156 and 157 is seated between the shoulders 159 and 163 screwable into the end of said sleeves 160 and 161. Sleeve 161 is insulated by means of an annular bushing 164 from the casing 158 so that the two contact members 156 and 157 are insulated from each other. A flange 165 is formed on casing 158 by means of which the said contact device may be screwed into the floor of the bowling alley within slot 139. It will be noted in Figure 7 that two contact devices are provided, one at each end of the switch structure. This is for the purpose of permitting two switches in adjacent alleys to be connected in close proximity to one another and to have the leads thereof run through a conduit positioned in the gutter common to the two alleys. In order to permit of left hand use the said conductors are positioned at both ends of the switch.

The use of the device is evident. As can best be seen in Figures 10 and 11 the upper portion of the operating members 117—120 are formed slightly inclined so that the forward end of the same lies flush with the floor while the rearward edge is somewhat raised. A bowler's foot or a ball in engaging these operating members gradually depresses the same until the same have been forced downward sufficiently to close either of the switches J and K. As previously described the instantaneous closing of these switches is not sufficient to operate the signal while a relatively extended closure of the same causes the signal to be operated and the foul to be indicated.

Figure 14:
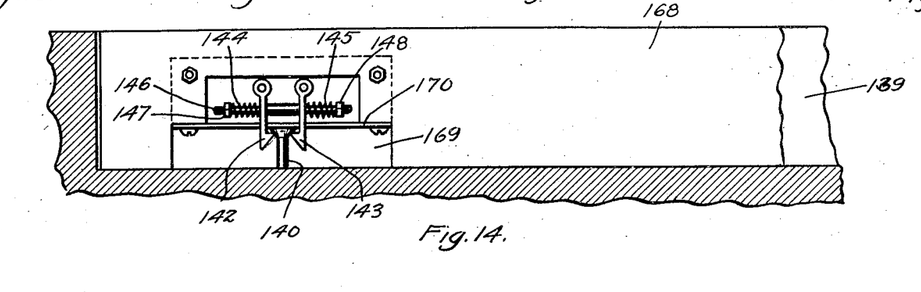
Fig. 14 is a detail view similar to Figure 8 showing the adaptation of dummies to the device.

In case one of the switches A in the bowling alley becomes inoperative and another switch unit does not happen to be available we provide a dummy such as indicated at 168 in Figure 14 which can be substituted in place of the entire switch unit A. This dummy is made of wood and is of the exact height, width and length to completely fill the slot 139 in the floor of the bowling alley. At each end of said dummy is formed an opening 169 in which is attached a short section of angle 170 of the exact shape and size of angle 105. To this angle is pivotally secured hooks 142 and 143 identical with the hooks 142 and 143 of the switch A, which hooks are spring operated and mounted in the same manner. These hooks are to engage upon the screws 140 and 141 to hold the said dummy in place in identically the same manner as the spring itself. It can readily be comprehended that in the event that one of the switches becomes broken or rendered inoperable the same may readily be removed and the said dummy placed in the slot to completely close the opening therein. With this construction the alley may be immediately converted into an alley of the ordinary type in which a single straight line across the floor serves to indicate the foul line of the alley.

Figure 13:
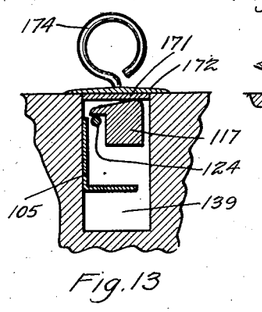
Fig. 13 is a sectional view of the foul line switch showing the guard member mounted over the same.

To prevent the switch structure in the floor of the alley from being clogged with dirt the members 117—120 are spaced from the edge of the edges of the slot 139 so that all dirt and dust entering the same while bowling passes down through and is deposited at the bottom of the slot. To further aid in keeping the switch clean while the floor is being swept or varnished we provide a cover or guard member 171 adapted to fit down into the slot 139. This cover member is formed with two wedge-shaped flanges 172 adapted to engage upon the upper surface of the floor to hold the same in place. Two eyes 174 secured to said cover permit of the removal of the same from the floor. With this device the floor can be swept in the ordinary manner, the dirt being swept over the said cover member. When the floor is cleaned the said cover member can be readily removed by means of the eyes 174 mounted thereon.

Figure 15:
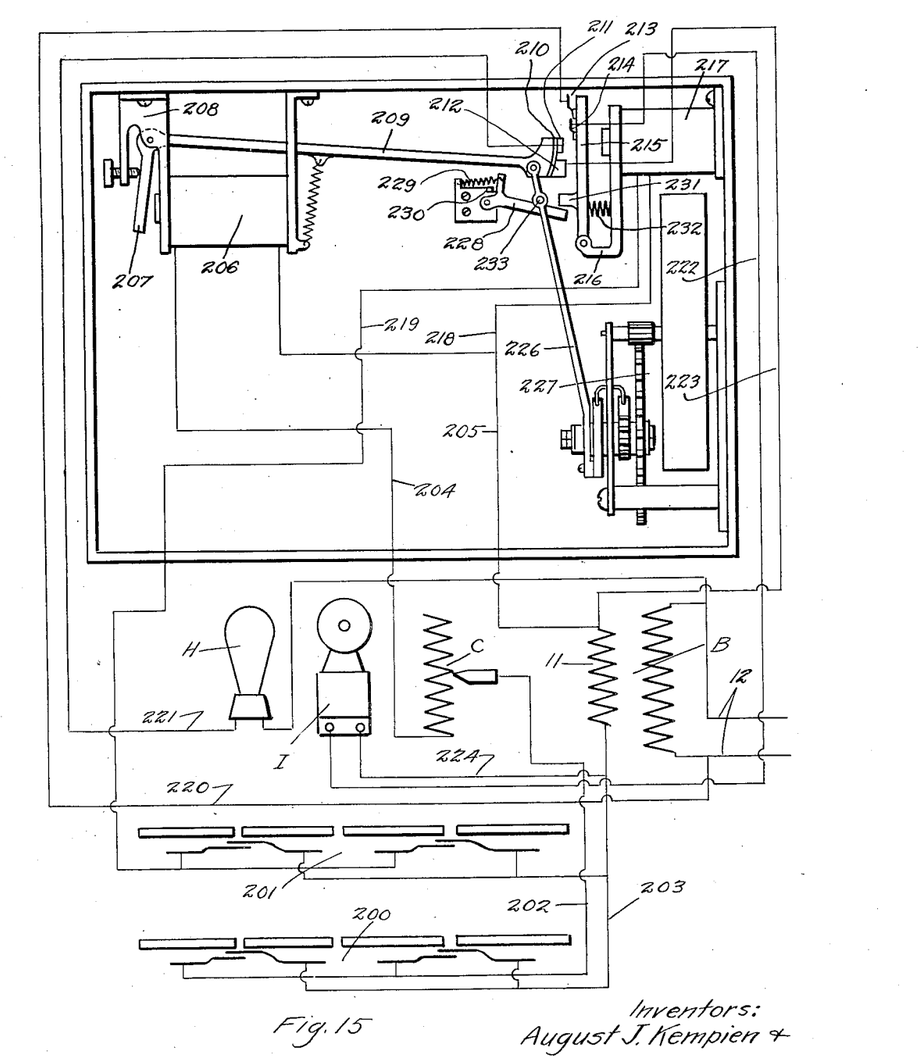
Fig. 15 is a view similar to Figure 1 showing another form of the invention.

In Figure 15 we have shown a modified form of the invention. In this device the timing effect desired for rendering the foot effective to operate the signal and the ball ineffective to operate the same is secured by having two floor switches spaced a short distance apart in the floor of the alley, which switches control two sets of magnets. In the said figure the first floor switch is shown at 200 and a second floor switch at 201. Switch 200 is connected by conductors 202 and 203 with the low tension coil 11 of the transformer B and to the resistance C. The same is further connected by leads 204 and 205 to an electromagnet 206. An armature 207 pivoted to bracket 208 formed on said electro-magnet has an arm 209 extending rearwardly of the same. This arm is normally held downward by a coil spring 225 and has attached to it an operating link 226 which is connected with a timing device such as shown in the other form of the invention and which is indicated in its entirety at 227. When switch 200 is actuated by either the ball or the foot of the operator the electro-magnet 206 is energized and arm 209 swung upwardly by means thereof. At the end of arm 209 is provided an insulating member 210 on which is attached two contact members 211 and 212. These contact members are adapted to engage two spring clips 213 and 214 mounted on a swinging arm 215. Arm 215 in turn is pivoted on a bracket 216 formed on an electro-magnet 217 which is adapted to attract the arm 215 so as to withdraw the switch contacts 213 and 214 away from contacts 211 and 212. The circuit for operating magnet 217 consists of conductors 218 and 219 which are connected with transformer B and the second switch 201. It can readily be comprehended that when the second switch 201 is closed that arm 215 is drawn away from engagement with arm 209 so that no contact is made by means of the switches at the end of the same. Contacts 211 and 213 are connected by means of leads 220 and 221 directly with the line 12 and the electric light 8 shown in the other form of the invention. In a similar way contacts 212 and 214 are connected by means of leads 223, 222, and 224 with the electric bell I and the transformer B of the other form of the invention. It can readily be comprehended that as the arm 209 is drawn upwardly by the closing of the first switch 200 that the two last named circuits are closed and both the light H and bell I actuated. As soon as the second switch 201 is closed arm 215 is attracted by the electro-magnet 217 and the said circuits broken thereby terminating the action of the signals.

In operation when the foot of the bowler passes the foul line switch 200 only is actuated which causes the signal to become operative. When bowling ball is bowled along the alley the first switch 200 is operated and then the switch 201 which has the effect of first switching arm 209 upwardly and then withdrawing arm 215 from making contact with the arm 209. This prevents the signals from operating.

On account of the timing mechanism 227, arm 209 remains in upward position while the said timing mechanism is in operation. In order to hold the arm 215 at its open position while arm 209 is returning we provide a finger 228 which is held by a spring 229 into a substantially horizontal position terminated by a stop 230. This finger normally engages a lug 231 on arm 215 so that when the said arm 215 is attracted by magnet 217 the said finger 228 comes in alignment with lug 231 and prevents the return of the said arm. A compression coil spring 232 serves to return arm 215 to normal position when finger 228 has been released. For releasing the said finger we employ a pin 233 formed on link 226 which as arm 209 descends into its normal position engages the said finger 228 and releases the same from engagement with lug 231 thereby resetting arm 215 to its normal position. With this construction arm 209 is always actuated whether the foot of the player or the ball passes over the same.

In accordance with the patent statutes we have described the principles of operation of our invention together with the apparatus which we now consider to represent the best embodiment thereof, but we desire to have it understood that the construction shown is only illustrative and that the invention can be carried out by other means and applied to uses other than those above set forth within the scope of the following claims.

We claim:—

1. A foul indicator comprising a signal device, means for operating said signal device including a member positioned in the floor of the bowling alley, and means for rendering said operating means inoperative when the floor member is momentarily actuated.

2. A foul indicator comprising a signal device, means for operating said signal device including a member positioned in the floor of the bowling alley signal actuating means, and a weighted member controlling said signal actuating means adapted to hold said signal device inoperative upon momentary actuation of said floor member.

3. A foul indicator comprising an electrical signal device, a normally open circuit for operating said signal device, a magnet having an armature for closing said signal circuit normally holding said signal circuit open, a normally open circuit for operating said magnet, circuit closing means positioned in the floor of the bowling alley for closing said magnet circuit and means for holding said armature from movement upon momentarily closing said floor circuit closing device.

4. A foul indicator comprising an electrical signal device, a normally open circuit for operating said signal device, a magnet having an armature for closing said signal circuit normally holding said signal circuit open, a normally open circuit for operating said magnet, circuit closing means positioned in the floor of the bowling alley for closing said magnet circuit, and a weighted member for holding said armature from movement upon momentarily closing said floor circuit closing device.

5. A foul indicator comprising an electrical signal device, a normally open circuit for operating said signal device, a magnet having an armature for closing said signal circuit normally holding said signal circuit open, a normally open circuit for operating said magnet, circuit closing means positioned in the floor of the bowling alley for closing said magnet circuit, an arm secured to said armature and a weight adjustably positioned on said arm for holding said armature from movement upon momentarily closing said floor circuit closing device.

6. A foul indicator comprising a signal, means positioned at the foul line of the alley for rendering said signal operative upon the passage of a foot of a player over the same, and time controlled means for rendering said signal inoperative upon the passage of a ball over the same.

7. A foul indicator comprising an electric signal, a switch at the foul line of the alley, an actuating member for actuating said signal, a circuit for operating said actuating member connected with said switch, a source of current connected with said circuit, and means for varying the current supply to said actuating member.

8. A foul indicator comprising an electric signal, a switch at the foul line of the alley, an actuating member for actuating said signal, a circuit for operating said actuating member connected with said switch, a source of current connected with said circuit, and a variable resistance in said circuit for varying the current to said actuating member.

9. A foul indicator comprising a signal, an actuating member, controlling means positioned in the floor of the alley and time controlled means for rendering said actuating means operable upon the passage of the foot over said controlling means and inoperative upon the passage of a bowling ball over said controlling means.

10. A foul indicator comprising a circuit, an electro-magnet in said circuit, a switch positioned in the foul line of an alley for controlling said circuit, a variable resistance in said circuit, a switch controlled by said electro-magnet, a second circuit connected with said switch, a signal in said second circuit, and a weighted member connected with said electro-magnet retarding the movement thereof.

11. A foul indicator comprising a circuit, an electro-magnet in said circuit, a switch positioned in the foul line of an alley for controlling said circuit, a variable resistance in said circuit, a switch controlled by said electro-magnet, a second circuit connected with said switch, a signal in said second circuit, a weighted member associated with said electro-magnet, and means for holding said second switch closed for an extended period of the time after the operation of said electro-magnet.

12. A foul indicator comprising a signal, an actuating member for said signal, means for momentarily operating said actuating mechanism upon the passage of the player's foot on the foul line and means for prolonging the operation of said signal for a fixed period of time.

13. A foul indicator comprising a signal, means for rendering said signal operative during the occupancy of the foot over the foul line and means for prolonging the operation of said signal for a fixed period of time after the foot has been removed from the foul line.

14. A foul indicator comprising an electrical signal device, a normally open circuit for operating said signal device, a magnet having an armature for closing said signal circuit normally holding said signal circuit open, a normally open circuit for operating said magnet, circuit closing means positioned in the floor of the bowling alley for closing said magnet circuit, means for holding said armature from movement upon momentarily closing said floor circuit closing device and means for maintaining said signal circuit closed for an extended period of time upon the operation of said electro-magnet.

15. In combination with the floor of a bowling alley having a transverse slot, a support, means located within said slot for detachably holding said support, and switch members mounted upon said support.

16. In combination with the floor of a bowling alley having a transverse slot, an angle support, switch members mounted upon said angle support, operating members for said switch secured to said support and extending upwardly through said slot.

17. In combination with the floor of a bowling alley having a transverse slot, and a pair of lugs secured therein, a support adapted to rest upon said lugs, switch members secured to said support and latch members adapted to engage said lugs for detachably holding said structure within the slot.

18. A bowling alley floor switch comprising a switch element, a pair of independently movable members adapted to independently operate said switch element.

19. A bowling alley floor switch comprising a plurality of independently movable members placed adjacent one another and switches adapted to be operated by either or any two of said adjacent members.

20. A bowling alley floor switch comprising a transverse member, means for supporting said member for parallel vertical movement and switch elements adapted to be operated by said member.

21. A bowling alley floor switch comprising a support an operating member having a portion thereof pivoted to said support, means for slidably connecting said member to said support and switch elements operated thereby.

22. A bowling alley floor switch comprising a support, operating members longitudinally positioned relative to said support, pivots extending longitudinally of said support for pivoting said operating members, and a slidable member connected with said support for guiding the movement of said operating member, and switch elements operated by said operating member.

23. A foul indicating mechanism comprising two signals, means for momentarily actuating one of said signals upon the commission of a foul, and means for prolonging the operation of the other of said signals upon the commission of a foul.

24. A foul indicating mechanism comprising two signals, means for simultaneously actuating both of said signals upon the commission of a foul, means for rendering one of said signals inoperative upon momentary operation of the same, and means for rendering the other of said signals inoperative upon the lapse of a short period of time after the rendering of said first signal inoperative.

25. A foul indicating mechanism comprising two signals, electrical circuits for operating said signals, a pair of switches for causing said signals to operate the same, means for simultaneously closing both of said switches, means for opening one of said switches upon momentary operation of the signal, and means for subsequently opening the other of said switches.

26. A foul indicating mechanism comprising two signals, electrical circuits for operating said signals, a pair of switches for causing said signals to operate the same, means for simultaneously closing both of said switches, and time controlled means for successively opening one of said switches after the other.

27. A foul indicator comprising a signaling device, means positioned in the floor of the bowling alley for operating said signalling device upon the passage of the foot of the bowler or bowling ball upon the same, and means positioned in the floor of said alley and spaced from said first means for rendering said signal inoperative upon the passage of a bowling ball over the same.

28. A foul indicator comprising a signal, electrical circuits for operating said signal, a switch in the bowling alley for closing said circuit to render the signal operative, a second switch spaced from said first switch and positioned forwardly of said first switch and means controlled thereby for rendering said signal inoperative.

In testimony whereof we affix our signatures.

AUGUST J. KEMPIEN.
THOMAS C. FORBES.